United States Patent [19]
Lee

[11] Patent Number: 5,148,428
[45] Date of Patent: Sep. 15, 1992

[54] MODULAR ARCHITECTURE FOR VERY LARGE PACKET SWITCH

[75] Inventor: Tony T. Lee, Bridgewater Township, Somerset County, N.J.

[73] Assignee: Bell Communictions Research, Inc., Livingston, N.J.

[21] Appl. No.: 670,455

[22] Filed: Mar. 11, 1991

Related U.S. Application Data

[63] Continuation of Ser. No. 345,983, May 2, 1989, abandoned.

[51] Int. Cl.[5] .............................. H04J 3/02; H04J 3/26
[52] U.S. Cl. ..................................... 370/60; 370/65.5
[58] Field of Search ................. 370/58.1, 60, 56, 65.5, 370/112, 94.1

[56] References Cited

U.S. PATENT DOCUMENTS

| | | | |
|---|---|---|---|
| 4,314,367 | 2/1982 | Bakka et al. | 370/60 |
| 4,392,222 | 7/1983 | Ando | 370/60 |
| 4,472,801 | 9/1984 | Huang | 370/60 |
| 4,761,780 | 8/1988 | Bingham et al. | 370/60 |
| 4,813,038 | 3/1989 | Lee | 370/60 |
| 4,837,761 | 6/1989 | Isono et al. | 370/60 |
| 4,891,803 | 1/1990 | Huang et al. | 370/60 |
| 4,893,304 | 1/1990 | Giacopelli et al. | 370/60 |
| 4,899,334 | 2/1990 | Shimizu | 370/60 |
| 4,899,335 | 2/1990 | Johnson, Jr. et al. | 370/60 |
| 5,008,878 | 4/1991 | Ahmadi et al. | 370/94.1 |

FOREIGN PATENT DOCUMENTS 0312628 4/1989 European Pat. Off. .

OTHER PUBLICATIONS

"Starlite: A Wideband Digital Switch," A. Huang et al., Proceeding of Globecom 84, pp. 121-125.
"A Broadband Packet Switch for Integrated Transport," J. Hui et al., IEEE Journal on Selected Areas in Communiucations, vol. SAC-5, No. 8, pp. 1264-1273, Oct. 1987.
"The Architecture of a Multicast Broadband Packet Switch," T. T. Lee et al., Proceedings of Infocom 1988, pp. 1-8.
"Reservation-Based Contention Resolution Mechanism for Batcher-Banyan Packet Switches," B. Bingham et al., Electronics Letters, 23rd, vol. 24, No. 13, pp. 772-773, Jun. 1988.
"A Study of Non-Blocking Switching Networks," Charles Clos, Bell System Technical Journal, vol. 32, pp. 406-424, 1953.
"Broadband ISDN Switching Capabilities from a Services Perspective," Dan Spears, IEEE Journal on Selected Areas in Communications, vol. SAC-5, No. 8, pp. 1222-1230, Oct. 1987.
"The Knockout Switch: A Simple Modular Architecture for High-Performance Packet Switching," Y. S. Yeh et al., Proc. ISS'87, pp. 801-808, Mar. 1987.
"A Fast Packet Switch for the Integrated Services Backbone Network," Peter Newman, IEEE Journal on Selected Areas in Communications, vol. 6, No. 9, pp. 1468-1479, Dec. 1988.
"A Packet Network for BISDN Applications," L. T. Wu et al., Proc. of 1988 Zurich Seminar on Digital Commun., Zurich, pp. 191-197, 1988.
"Multichannel Bandwidth Allocation in a Broadband Packet Switch," Achille Pattavina, IEEE Journal on Selected Areas in Communications, vol. 6, No. 9 pp. 1489-1499, Dec. 1988.

*Primary Examiner*—Douglas W. Olms
*Assistant Examiner*—Min Jung
*Attorney, Agent, or Firm*—Leonard Charles Suchyta; Loria J. Baskerville

[57] ABSTRACT

A modular architecture for a very large packet switch is disclosed. Each module comprises a Batcher subnetwork and an expansion routing network, which expansion routing network includes a set of binary tree subnetwork interconnected with a set of banyan subnetworks. A packet may be routed from an input of the switch to any output by means of only one switch module. This means that the switch modules may be synchronized independently of each other and if one module fails the remainder of the modules may continue to route packets.

25 Claims, 6 Drawing Sheets

| | NUMBER OF NETWORKS | DIMENSION | NUMBER OF STAGES | NUMBER OF NODES |
|---|---|---|---|---|
| BATCHER NETWORK | 1 | MxM | $\frac{\log M(1+\log M)}{2}$ | $\frac{M\log M(1+\log M)}{4}$ |
| BINARY TREE | M | 1xK | $\log K$ | $K-1$ |
| BANYAN NETWORK | K | MxM | $\log M$ | $\frac{M}{2}\log M$ |

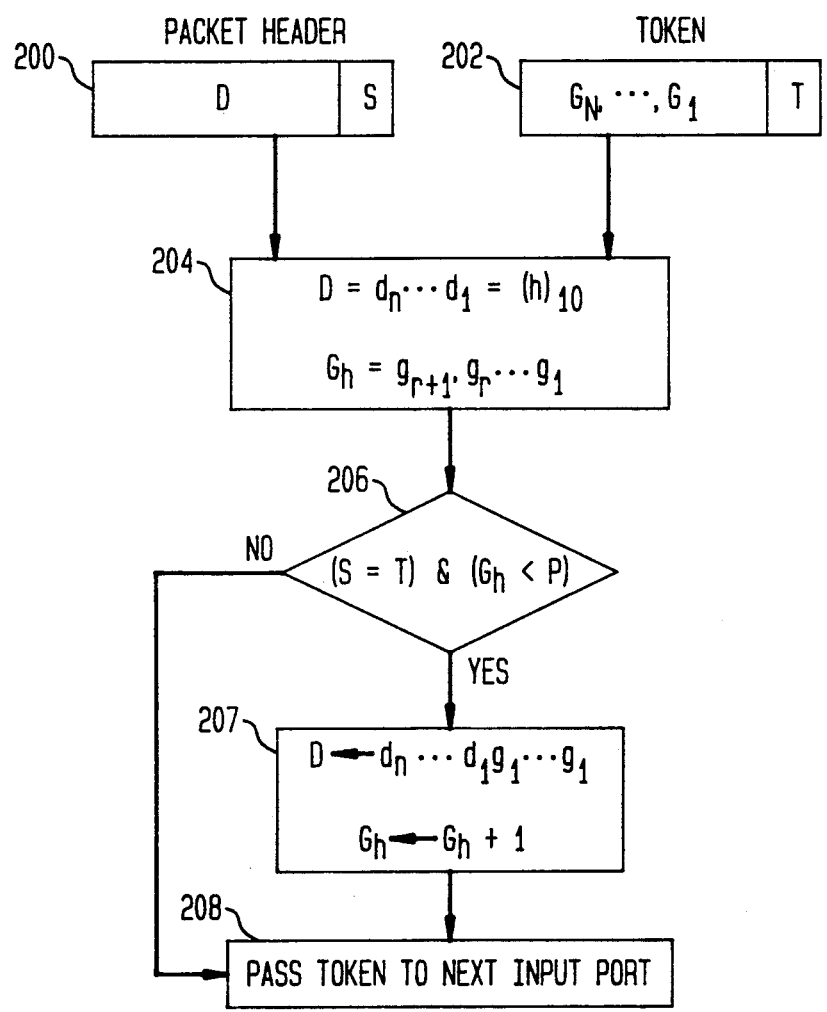

MODULAR ARCHITECTURE FOR VERY LARGE PACKET SWITCH

This application is a continuation of application Ser. No. 07/345,983, filed May 2, 1989, and now abandoned.

FIELD OF THE INVENTION

The present invention relates to a packet switch and, more particularly, to a modular architecture for a very large packet switch.

BACKGROUND OF THE INVENTION

A packet switching network comprises an array of packet switches interconnected by trunks. Typically, a packet switch comprises a set of inputs which receive arriving packets via a set of incoming trunks and a set of outputs which are connected to a set of outgoing trunks via which packets depart the switch.

The inputs and outputs are connected by a switch fabric. Illustratively, the switch fabric is a self-routing switch fabric. A self-routing switch fabric typically comprises an array of nodes organized into stages. At each node routing decisions are made based on an address contained in the header of the packet being routed. Typically, such self-routing networks are synchronous so that packets arrive simultaneously at the inputs in intervals of time known as time slots.

The most commonly used self-routing switching fabric utilizes a Batcher network and a banyan network. A banyan network is a self-routing network which can route a packet from any input to any output based on an address contained in the packet header. However, the banyan network suffers from internal packet collisions. To eliminate internal collisions in a banyan network, the packets in any time slot are presented to the inputs of the banyan network in increasing or decreasing order according to destination address. In addition, the packets received at the inputs to the banyan network should be concentrated, i.e., there should be no inactive input lines to the banyan network in between active input lines to the banyan network in any particular time slot. Thus, the banyan network is usually preceded by a Batcher network which sorts arriving packets according to destination address. The sorted packets are then routed to the desired outputs as indicated by their addresses by the banyan network. Thus, the combined Batcher-banyan network provides a full connection, internally collisionless switch fabric. To insure that the packets arriving at the banyan network in a time slot are concentrated, a concentrator network may be located between the Batcher network and the banyan network.

For a banyan network which forms part of a Batcher-banyan network to be non-blocking (i.e. suffer no internal collision), the Batcher outputs and the banyan inputs are connected with a pattern known as a perfect shuffle. Consider a situation where there are 64 interconnections between the Batcher network and the banyan network. Assume the Batcher outputs are numbered 1 to 64 and that the banyan inputs are also numbered 1 to 64. The first half of the Batcher outputs (1–32) are connected to the odd numbered banyan inputs 1,3 . . . 63. The second half of the Batcher outputs (33–64) are connected to the even numbered banyan inputs 2,4 . . . 64. This is like a perfect shuffle of the two halves of a deck of playing cards.

While switch fabrics based on the Batcher-banyan network do not suffer from internal collisions, they do suffer from external collisions. An external collision occurs when two or more packets destined for the same output are simultaneously presented at the inputs of the Batcher-banyan network.

Several algorithms have been devised for resolving such output port conflicts so as to eliminate external collisions in a Batcher-banyan network. These algorithms are 1. Recirculation Algorithm: This algorithm feeds blocked packets back to the inputs for re-entry at the next time slot. (See e.g., Huang, A. and Knauer, S., Starlite: A Wideband Digital Switch, *Proceeding of Globecom* 84, pp. 121-125).

2. Three Phase Algorithm: This algorithm is also a feedback scheme. Each input sends a probing header for arbitration in phase 1. The inputs then receive a positive or negative acknowledgement back from the outputs in phase 2. The actual transmission of the winning packets, i.e., those who receive positive acknowledgements, takes place in phase 3. (See e.g., Hui, Y. N. J. and Arthurs, E., A Broadband Packet Switch for Integrated Transport, *IEEE Journal on Selected Areas in Communications*, Vol. 5, No. 8, October 1987, pp. 1264-1273; see also T. T. Lee et al, "The Architecture for a Multicast Broadband Packet Switch", Proceedings of Infocom 1988, pp. 1-8 which describes a three phase algorithm in which only a Batcher network is required for arbitration).

3. Ring Reservation Algorithm: This is a token passing scheme. At the beginning of a time slot, a clear token is issued by a token generator. The token has an N-bit field to indicate the availability of each of N outputs. The token is circulated around a ring connecting input ports associated with each of the packet switch inputs. When the token arrives at a particular input port, the packet at the head of a queue at the particular input port will make a reservation by writing a logic "1" into the bit position of the token corresponding to the desired output, if the desired output has not been reserved by a previous input port on the ring. If the intended output is successfully reserved, the packet is transmitted during the next time slot. The reservation cycle and transmission cycle can be overlapped to minimize the overhead. (See, e.g., Bingham B. and Bussey H., Reservation-Based Contention Resolution Mechanism for Batcher-Banyan Packet Switches, *Electronics Letters*, 23rd, Vol. 24, No. 13, June 1988, pp. 772-773; see also B. Binghan et al, U.S. Pat. No. 4,761,780).

Any of the three algorithms mentioned above has the potential to resolve output port conflicts and eliminate external collisions for a switch fabric based on a Batcher-banyan network.

A packet switch which serves as a central office for a broadband telecommunications network will require approximately 10,000 inputs and outputs. Such very large packet switches, when implemented using very large Batcher-banyan switch fabrics, have a number of significant problems. First, the non-blocking property of the Batcher-banyan switch fabric requires that the whole set of input packets (i.e. the set of packets arriving at the inputs of the switch fabric during one time slot) be synchronized at every stage of the switch fabric. For a switch with 10,000 inputs, this means synchronizing up to 10,000 packets within a network of about 100 stages. A second problem with a very large packet switch is the physical limitations on the size of the VLSI chips and the complexity of the interconnection wiring between the chips. A third problem with very large packet switches relates to reliability and maintainability. It is clear that smaller switch fabrics are easier to develop, to test, to maintain, and to replace.

A number of approaches have been developed for modularizing very large switches (see e.g., C. Clos, "A Study of Non-Blocking Switching Networks", *Bell System Technical Journal*, vol. 32, 1953, pp. 406-424; D. R. Spears, "Broadband ISDN Switching Capability From A Service Perspective", *IEEE Journal of Selected Areas in Comm.*, Vol. SAC-5, No. 8, October 1987, pp. 1222-1230). Conventional approaches to modularizing very large Batcher-banyan switch fabrics have not proven to be successful in solving the above-identified problems. When modularized in the conventional manner, very large Batcher-banyan switch fabrics are formed from relatively small Batcher-banyan modules which are grouped in stages. One output of each Batcher-banyan module in one stage is connected to each Batcher-banyan module in the next stage. This provides full interconnectivity between all the inputs and all the outputs of the very large packet switch. However, in order for packets arriving at the switch in a particular time slot to be routed from particular inputs to particular outputs, the packets must pass through a plurality of the relatively small Batcher-banyan modules in a plurality of stages. When this type of modular architecture is utilized, it is possible to independently synchronize the individual Batcher-banyan modules only if buffers are utilized between the stages. Without such buffers all of the modules have to be globally synchronized. Furthermore, the conventional modular architecture described above requires complex interconnections between the stages of Batcher-banyan modules. In addition, because a packet must pass through more than one of the Batcher-banyan modules to be routed from a particular input to a particular output, if one of the Batcher-banyan modules fails, the switch as a whole no longer operates properly. Still another problem with the conventional modular architecture relates to conflict resolution. Because the modules do not operate independently of each other, and because each packet has to pass through a plurality of modules in a plurality of stages, conflict resolution is very difficult. In particular, conflict resolution has to be performed at every Batcher-banyan module, which conflict resolution also requires buffers internally between the stages. Accordingly, such a conventional modular architecture is not suitable for implementing a very high-speed packet switch.

To overcome the above-described problems which are characteristic of very large packet switches, it is an object of the present invention to provide a modular architecture for a very large packet switch, which architecture utilizes modules that operate independently of each other. More particularly, it is an object of the present invention to provide a very large packet switch constructed from a plurality of modules which can be synchronized independently and which are of relatively simple construction for ease of maintenance and high reliability.

SUMMARY OF THE INVENTION

In accordance with the present invention, a packet switch having N inputs and N outputs may be implemented using K ($1 < K < N$) relatively small switch modules. The set of N inputs is partitioned into K subsets, so that each subset has $M = N/K$ inputs. Each subset of M inputs is connected to all N outputs using one of the K switch modules. More particularly, each switch module has M inputs and N outputs. The $j^{th}$ output of each module is connected to a multiplexer, which multiplexer is connected to the $j^{th}$ output of the packet switch. Therefore, collectively, the $j^{th}$ output of all switch modules are termed corresponding outputs.

The switch module is the basic building block of the N×N packet switch according to the present invention. Each of the switch modules is an autonomous, non-blocking, self-routing packet switch.

Illustratively, each switch module comprises a Batcher sorting subnetwork and an expansion routing network. The expansion routing network comprises a set of binary tree subnetworks interconnected with a set of banyan subnetworks. In contrast with the conventional modular packet switches described above, a packet is routed from a particular input to a particular output, through use of only one switch module. There are no interconnections between modules, and the modules operate independently of each other.

The absence of such interconnections simplifies the operation and maintenance of the entire packet switch. In particular, the inventive packet switch architecture allows for the independent synchronization of the modules which simplifies timing substantially. The relatively small size of each switch module makes synchronization within each module relative straightforward. In the packet switch of the present invention, it is not necessary to synchronize the individual switch modules with one another. In other words, in a 10,000 input switch, it is not necessary to synchronize 10,000 packets which arrive in a particular time slot. It is only necessary to independently synchronize the packets routed within each of the individual switch modules.

In addition, it is an advantage of the packet switch of the present invention that contention resolution algorithms developed for Batcher-banyan switches, such as the Recirculation Algorithm, Three-Phase Algorithm, and Ring Reservation Algorithm, remain valid for the individual switch modules. In particular, the Ring Reservation Algorithm is an attractive contention resolution algorithm for the switch modules because a separate ring is used for each switch module, thereby converting an otherwise serial procedure into a parallel procedure.

A further advantage of the packet switch architecture of the present invention is that any fault in a module will disturb only the local traffic carried by that module, while the remaining switch modules can still be normally operated. Fault tolerance can therefore be accomplished by providing a spare module, not a duplication of the entire switch.

It should also be noted that because the packet switch of the present invention is constructed utilizing independent switch modules, the capacity of the packet switch can be distributed over a rural exchange area to reduce access costs.

For the reasons stated above, the modular packet switch architecture of the present invention represents a significant advance over conventional modular packet switch architectures especially for the implementation of very large packet switches.

BRIEF DESCRIPTION OF THE DRAWINGS

FIG. 8 illustrates, by way of flow chart, a ring reservation contention resolution algorithm for use in connection with the packet switch of FIG. 7, in accordance with an illustrative embodiment of the invention.

DETAILED DESCRIPTION

The detailed description of the invention is divided into a number of subsections. Subsection A describes a conventional packet switch architecture. Subsection B presents an overview of a modular packet switch architecture according to the present invention. Subsection C describes in detail the packet switch modules of the present invention. Subsection D describes contention resolution and output space extension for the packet switch modules of the present invention.

A. Conventional Packet Switch Architecture

Figure 1:
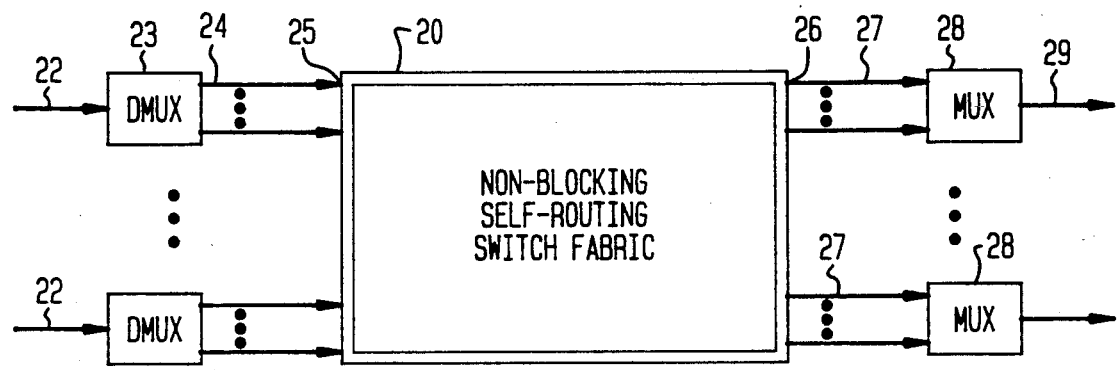
FIG. 1 schematically illustrates a very large packet switch comprising N inputs and N outputs.

Turning to FIG. 1, a very large packet switch 10 is schematically illustrated. The switch 10 comprises a non-blocking, self-routing switch fabric 20. The switch fabric 20 may be a Batcher-banyan switch fabric.

Packets arrive at the packet switch 10 via the high speed fiber optic input trunks 22. Each of the fiber optic input trunks 22 is connected to a demultiplexer 23. Each demultiplexer 23 demultiplexes the stream of packets arriving on the corresponding fiber optic trunk 22 into a plurality of packet streams on the input lines 24 because the electronic switch fabric 20 operates at a slower speed than the optical fiber input trunks 22.

Illustratively, the switch fabric 20 has N inputs 24 and N outputs 26 so that there are N input lines 24 leading to the switch fabric 20. There are also N output lines 27 leaving the switch fabric. Typically, N is on the order of 10,000.

The switch fabric 20 serves to route each packet arriving via an input line 24 to a particular output line 27 based on an address contained in the packet header. If the switch fabric 20 is a Batcher-banyan network, then the switch fabric 20 is synchronous and the packets are routed through the switch fabric in time slots. The packets leaving the switch fabric 20 via the lines 27 are multiplexed using the multiplexers 28 for transmission via the high speed fiber optic output trunks 29.

If the switch fabric 20 is a Batcher-banyan network, a mechanism (not shown in FIG. 1) may be provided to resolve conflicts when more than one packet is addressed to the same output line 27 in a time slot. The contention resolution mechanism may involve use of the Recirculation, Ring Reservation, or Three-Phase algorithms mentioned above.

Figure 2:
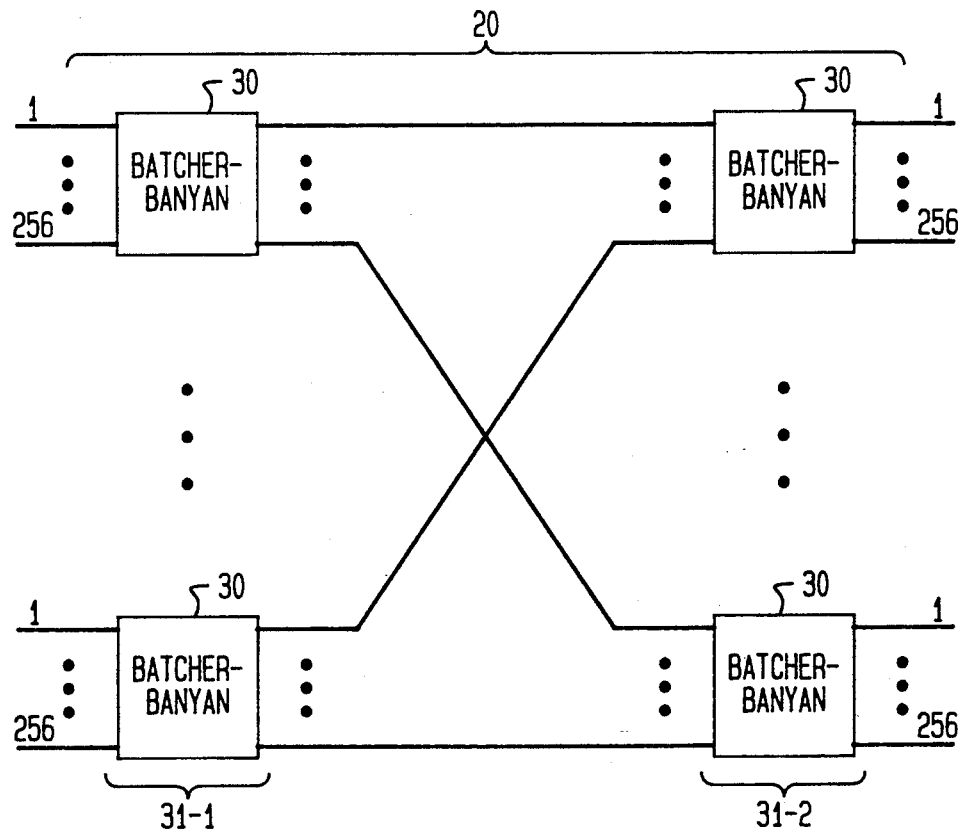
FIG. 2 schematically illustrates a conventional modular implementation of the switch of FIG. 1.

FIG. 2 schematically illustrates a conventional approach for modularizing the switch fabric 20 of FIG. 1. In FIG. 2, the switch fabric 20 is formed from a plurality of Batcher-banyan modules 30. The modules 30 are organized into stages Each module 30 includes a Batcher network and a banyan network. Illustratively, each Batcher-banyan module 30 has 256 inputs and 256 outputs. One output from each of the modules 30 in stage 31-1 is connected to each of the modules in the stage 31-2. Thus, the switch fabric of FIG. 2 provides full connectivity, i.e. a packet arriving at a particular input of a module in stage 31-1 can be routed to any output of any module in stage 31-2.

However, the switch fabric of FIG. 2 has a number of significant disadvantages. Firstly, for a packet to be routed from an input of the switch fabric to an output, it must pass through modules located in a plurality of stages. Thus, the individual modules 30 can be synchronized independently only if buffers are located between the stages. Secondly, the architecture of FIG. 2 requires a complex interconnection pattern between the Batcher-banyan modules of two adjacent stages. Thirdly, because packets are transmitted from particular inputs to particular outputs via a plurality of modules located in a plurality of stages, if one module fails, the entire switch fabric may not operate properly. A further disadvantage of the architecture of FIG. 2 is that contention between packets containing conflicting output addresses cannot be resolved independently for each module, thereby making overall contention resolution for the switch fabric quite complicated. For these reasons, the modular architecture of FIG. 2 has a limited throughput and is not suitable for implementation of a very large packet switch having on the order of 10,000 inputs and 10,000 outputs.

B. Overview of the Inventive Modular Packet Switch Architecture

Figure 3:
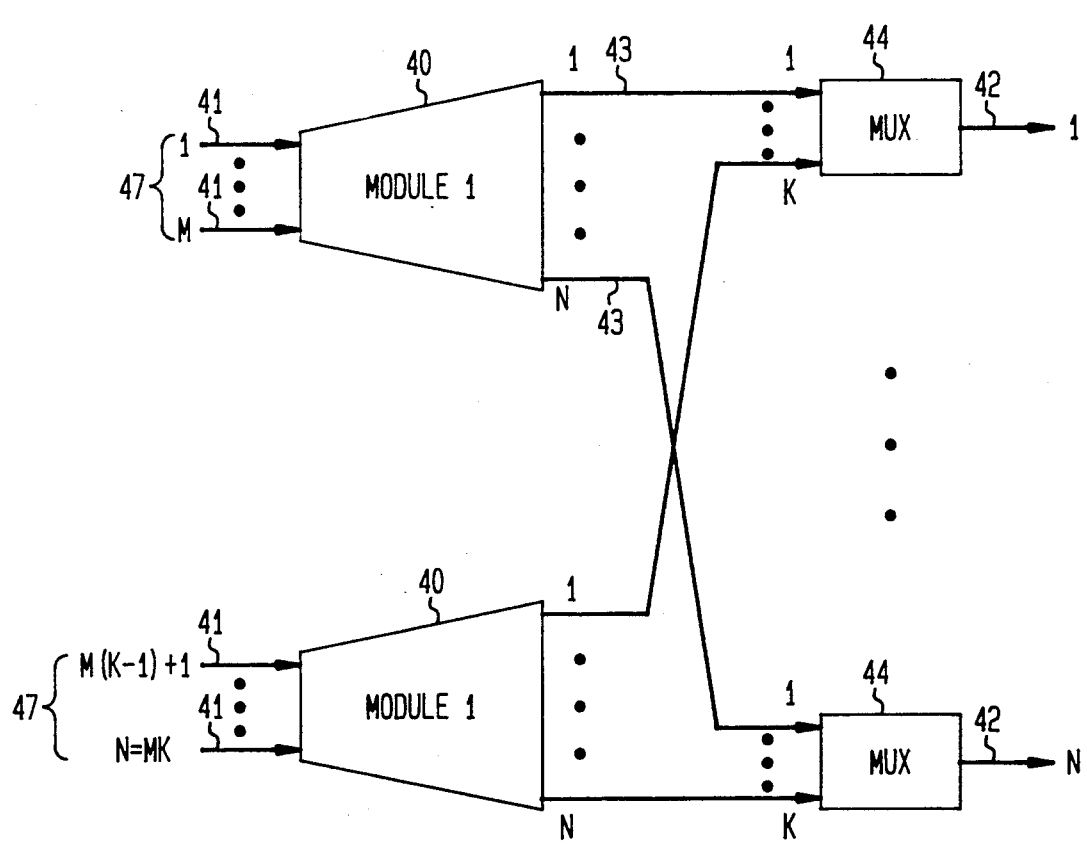
FIG. 3 schematically illustrates a modular implementation of the switch of FIG. 1, in accordance with an illustrative embodiment of the present invention.

A switch fabric 20' in accordance with an illustrative embodiment of the present invention is shown in FIG. 3. The switch fabric 20' has N inputs 41 and N outputs 42. The N inputs 41 are divided into K subsets 47 of M inputs each. Thus, the first subset 47 of inputs 41 includes inputs $1, \ldots, M$ and the $K^{th}$ subset 47 of inputs 41 includes inputs $M(K-1)+1, \ldots, MK$ where $MK = N$.

The switch module 20' comprises a plurality of modules 40. Each subset 47 of M inputs 41 forms the set of inputs for one of the switch modules 40. Thus, each switch module 40 has M inputs. Each module 40 has N outputs 43. The module outputs 43 with the same address, one from each module 40, are multiplexed together using the multiplexers 44 and fed to the output 42 bearing that address. It is a highly desirable feature of the present invention that each module 40 is an autonomous, non-blocking, self-routing packet switch network.

Figure 4:
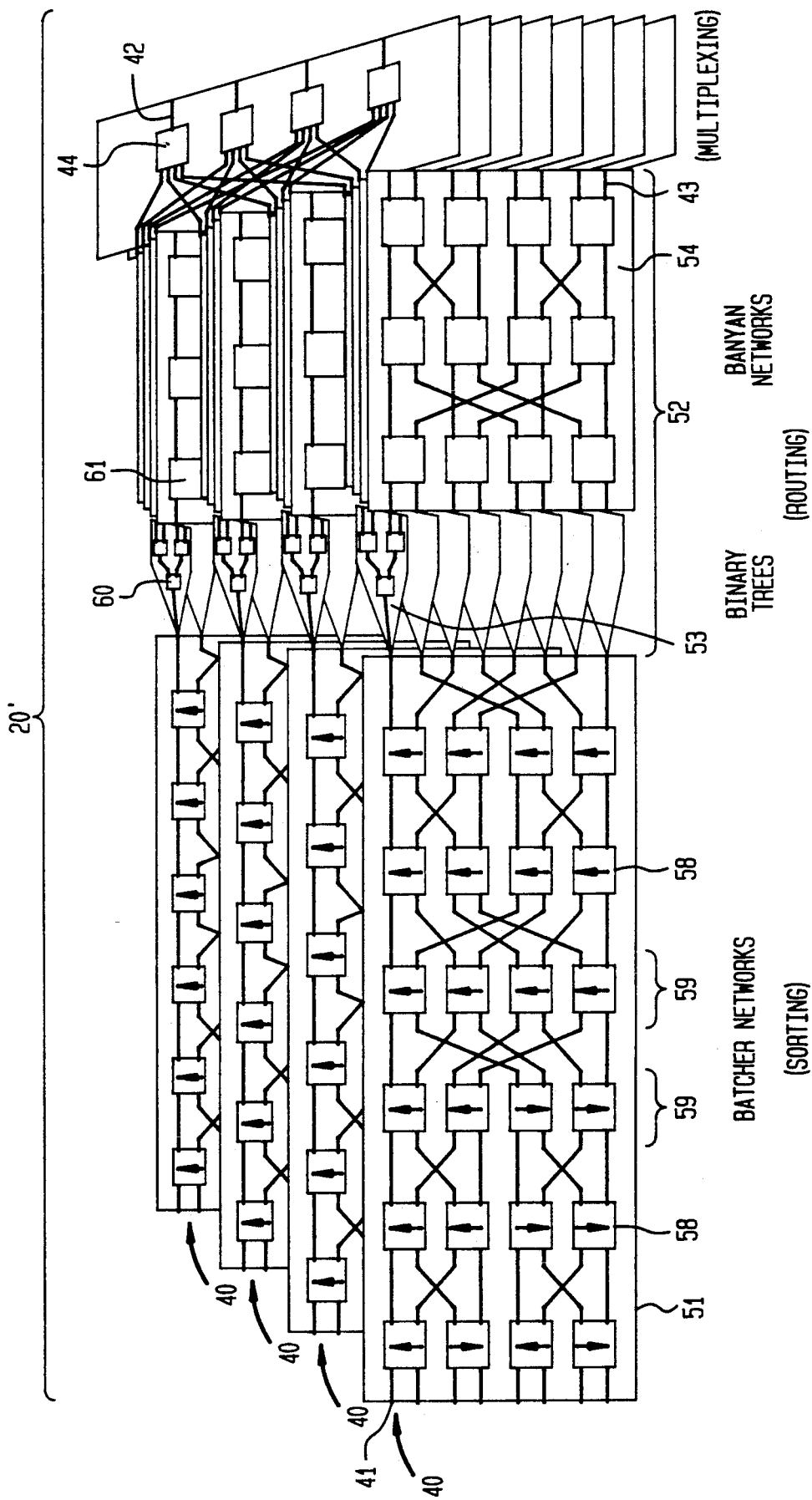
FIG. 4 schematically illustrates how a plurality of switch modules of the type shown in FIG. 3 are interconnected in three dimensions to form the switch of FIG. 3.

A three-dimensional implementation of the architecture of FIG. 3 is shown in FIG. 4. Illustratively, as shown in FIG. 4, the switch fabric 20' comprises a plurality of modules 40, each of which is implemented by combining a plurality of subnetworks in three dimensions.

Each module 40 of FIG. 4 comprises a Batcher sorting subnetwork 51 and an expansion network 52. In each module 40, the inputs to the Batcher subnetwork 51 form the module inputs 41 (see FIG. 3). The Batcher subnetwork 51 comprises an array of nodes 58 which are organized into stages 59.

The expansion network 52 comprises a set of binary tree subnetworks 53 and a set of banyan subnetworks 54. (Such binary-banyan networks have previously been used for replicating packets in a broadcast packet switch, see e.g., T. T. Lee, U.S. Pat. No. 4,813,038 issued Mar. 14, 1989). Illustratively, the binary tree subnetworks 53 comprise the nodes 60 and are stacked vertically. The banyan subnetworks 54 comprise the nodes 61 and are stacked horizontally. A detailed discussion of the operation of the binary tree subnetworks 53 and banyan subnetworks 54 is presented below along with a discussion as to how the networks 53, 54 are interconnected to form an expansion network 52. In FIG. 4, the multiplexers 44 (see FIG. 3) are arranged in sets of four, which sets of four multiplexers are stacked vertically. In each module 40, the outputs of the banyan subnetworks 54 form the module outputs 43 (see FIG. 3). As indicated above, the outputs 43 with the same address, one from each switch module 40, are multiplexed together by means of a multiplexer 44 and connected to the corresponding output 42.

The modules 40 of FIG. 3 and 4 operate as follows. As shown in FIG. 3, a set of N packets arriving at the inputs 41 in a particular time slot is partitioned into K subsets of M packets each so that each module 40 receives a subset of up to M packets at its inputs. The subset of packets arriving at the M inputs of a module 40 are sorted by the Batcher subnetwork 51. The sorted subset is then partitioned again into sub-sets by the binary tree subnetworks 53. In each module 40, the ordered packets of these sub-subsets are routed concurrently to their destinations by the banyan sub-networks 54. Finally, the multiplexers 44 collect the packets from the banyan outputs 43 and route them to the packet switch outputs 42.

The primary advantages of the modular architecture of the present invention can be understood with reference to FIG. 3 and 4. First it should be noted that the modules 40 are not interconnected with each other. It is only after processing by the modules 40, that packets leaving the modules 40 are multiplexed together. In other words, the modules 40 operate independently of each other. This means that each module 40 can be synchronized independently. It is only necessary to synchronize with each other the M packets which propagate through a module 40 in a given time slot rather than all N packets which may arrive at all the modules in a given time slot. Thus, the inventive packet switch architecture of FIG. 3 and 4 has a significant advantage over the conventional modular architecture of FIG. 2 especially when there is on the order of N=10,000 inputs. Since each module 40 is relatively small, synchronization is relatively straightforward.

In addition, in contrast to the conventional modular architecture of FIG. 2, no complex pattern of interconnections exists between groups of modules.

A further advantage of the inventive modular architecture of FIG. 3 and 4 is that a packet which is routed from a particular packet swtich input 41 to a particular packet switch output 42, only passes through one switch module 40. Thus, if one switch module 40 fails to operate, the remainder of the modules 40 will continue to operate properly. Fault tolerance can be accomplished by providing a spare module not a duplication of the entire switch. In contrast, because the conventional modular packet switch architecture comprises a complex arrangement of interconnected Batcher-banyan modules, if one module fails, the whole switch may fail to operate properly.

Another advantage of the inventive packet switch architecture is that contention resolution can be carried out for each module 40 separately. In addition, as indicated above, because the modules 40 operate independently of each other, the modules 40 can be spread over a rural exchange area to reduce access costs.

C. Detailed Description of a Switch Module for Use in the Modular Packet Switch Architecture of the Present Invention A switch module 40 (see FIG. 3 and 4) including a Batcher subnetwork 51 and an expansion network 52 is shown in more detail in FIG. 5. An expansion network is a network with more outputs than inputs.

In general, an n-stage expansion network with $M=2^m$ inputs and $N=2^n$ outputs is a combination of a set of M binary tree subnetworks, and a set of $K=N/M$ banyan subnetworks. Illustratively, $$M = K = \sqrt{N}.$$

Figure 5:
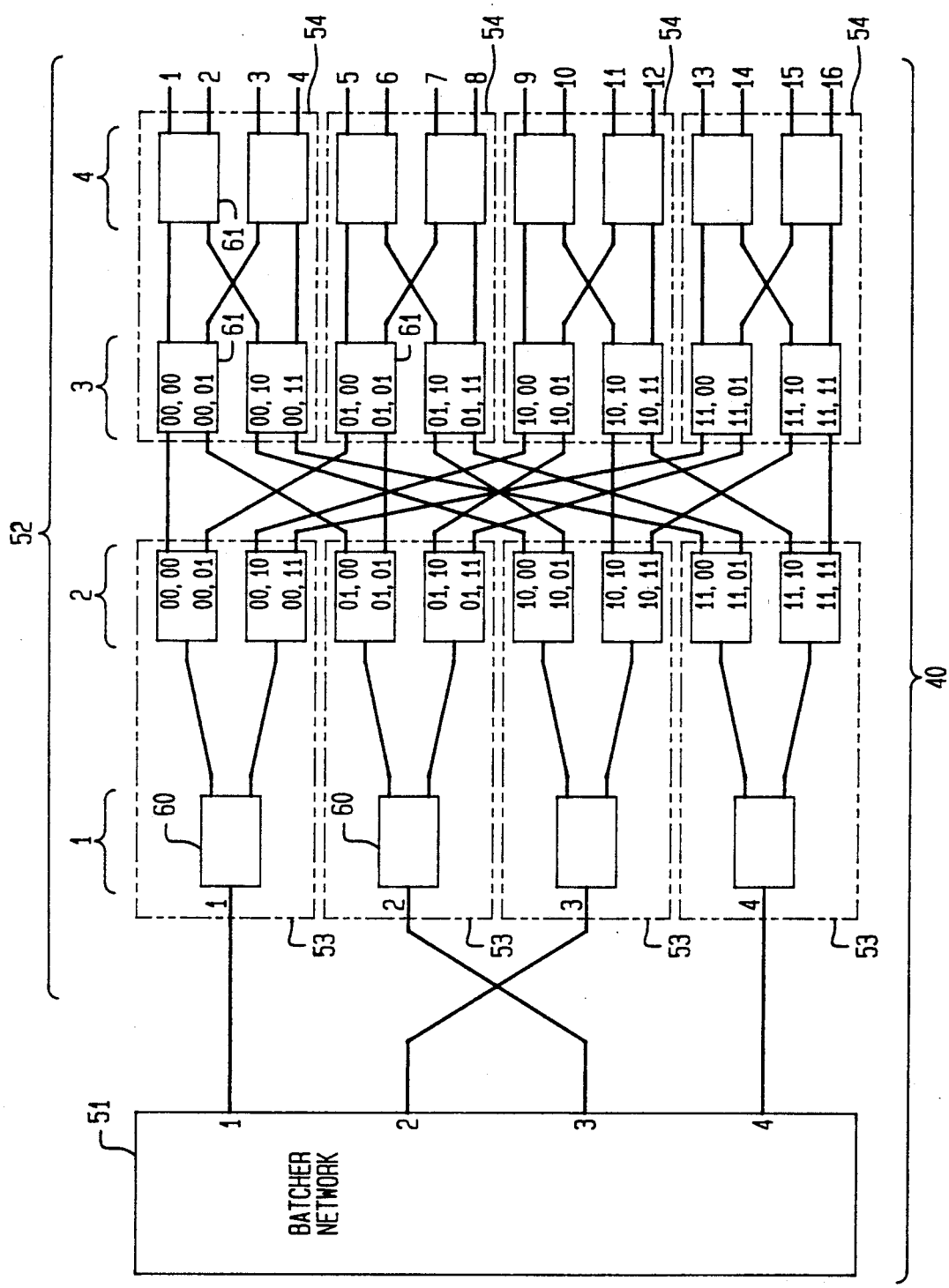
FIG. 5 schematically illustrates an expansion network for use in the packet switch modules of FIG. 3 and FIG. 4.

In FIG. 5, the module 40 comprises an expansion network 52 having n=4 stages (labeled 1,2,3,4 in FIG. 5). The network 52 of FIG. 5 has $M=2^m=2^2=4$ inputs (labeled 1,2,3,4 in FIG. 5) and $N=2^n=2^4=16$ outputs (labelled 1, . . . , 16 in FIG. 5). There are M=4 binary tree networks 53 and K=N/M=16/4=4 banyan networks 54.

It should be noted that the outputs 1,2,3,4 of the Batcher subnetwork 51 of the switch module 40 of FIG. 5 are connected to the inputs 1,2,3,4 of the expansion network 52 in a perfect shuffle pattern. This is topologically equivalent to a perfect shuffle pattern of connections at the inputs to the banyan subnetworks 54.

In an expansion network 52 for use in a switch module 40, each binary tree is a $1 \times K$ network and has $k=\log K=\log N-\log M=n-m$ stages. Thus, in FIG. 5, each of the binary tree networks 53 has one input and K=4 outputs. Each binary tree network 53 of FIG. 5 has $k=\log K=\log N-\log M=\log 16 - \log 4 = m-n = 4-2$ stages.

Similarly, in an expansion network for use in a module 40, each banyan subnetwork is an $M \times M$ network having m stages. Thus, in FIG. 5, each banyan subnetwork 54 is a $4 \times 4$ network having two stages.

Every node 60 in a binary tree subnetwork 53 is a $1 \times 2$ switch element capable of performing a binary routing algorithm based on an n-bit destination address in the header of a packet to be routed. That is, a node at stage j (as labeled in FIG. 5) sends an arriving packet out on the upper output link (link 0) or the lower output link (link 1) according to the $j^{th}$ bit of the packet header.

Similarly, every node 61 in a banyan network 54 is a $2 \times 2$ switch element which performs the same binary routing algorithm. Thus, a packet arriving on one of the two input links of a node 61 in the stage j (as labeled in FIG. 5) is routed to the upper output link (0) or the lower output link (link 1) according to the $j^{th}$ bit of an n-bit packet header.

The cross-interconnection of M binary tree subnetworks and K banyan subnetworks to form an expansion network is now considered. The outputs of a binary tree subnetwork can be labeled by two binary numbers $(x,y)=(x_1 \ldots x_m, y_1 \ldots y_{n-m=k})$ where $x_1 \ldots x_m$ is the top down numbering of the binary tree sub-network and $y_1 \ldots y_k$ is the local address of each output within its binary tree. The binary tree outputs are labeled with the appropriate binary numbers in FIG. 5. Similarly, the inputs of the banyan subnetworks can also be identified by two binary numbers (a,b) ($a_1 \ldots a_{n-m=k}, b_1 \ldots b_m$) where $a_1 \ldots a_{n-m}$ is the top down numbering of the banyan subnetworks and $b_1 \ldots b_m$ is the local address of the input within its banyan subnetwork. The banyan inputs are labeled with the appropriate binary numbers in FIG. 5. In an expansion network, an output r=(x,y) of a binary tree network and an input s=(a,b) of a banyan network are connected if (x,y)=(b,a). Thus, for example, the binary tree output 01,10 of FIG. 5 is connected to the banyan input 10,01. This interconnection pattern is easily realized in three dimensions as shown in FIG. 3 wherein the binary tree subnetworks 53 are stacked vertically and the banyan subnetworks 54 are stacked horizontally.

The possibility of internal collisions in the above-described expansion network is now considered. An internal collision occurs in a network when a node attempts to route two packets over the same internal link at the same time. The binary tree networks are formed from 1×2 switching elements which allow for only one input packet at any instant of time. Thus, packets will never collide in the binary tree networks, but, in general, internal collisions may occur in the subsequent banyan subnetworks.

As indicated above, if packets with distinct destination addresses arrive at the inputs of a banyan network in a particular time slot arranged in ascending or descending order according to destination address, then the banyan network is internally non-blocking. In each packet switch module 40 of FIG. 3, 4, and 5, a Batcher subnetwork 51 sorts the subset of packets incident on that module in a particular time slot according to destination address. The cross-interconnection pattern between the binary tree and banyan subnetworks described above insures that packets arrive at the banyan subnetworks 54 of a switch module 40 ordered according to destination address so that no internal collisions take place in the banyan subnetworks.

The non-blocking property of the expansion network 52 (see FIG. 4 and FIG. 5) may be stated another way. If the set of destination addresses of input packets to an expansion network is monotone and concentrated, then so is every subset of input packets to each banyan subnetwork of the expansion network. Consequently, a non-blocking, self-routing packet switch with more outputs than inputs may be formed by combining a Batcher sorting network and an expansion network in the manner described above. In a particular embodiment of the invention, a switch module 52 may include a concentrator network (not shown) located between the Batcher sorting subnetwork 51 and the expansion network 52.

Figures 6, 7:
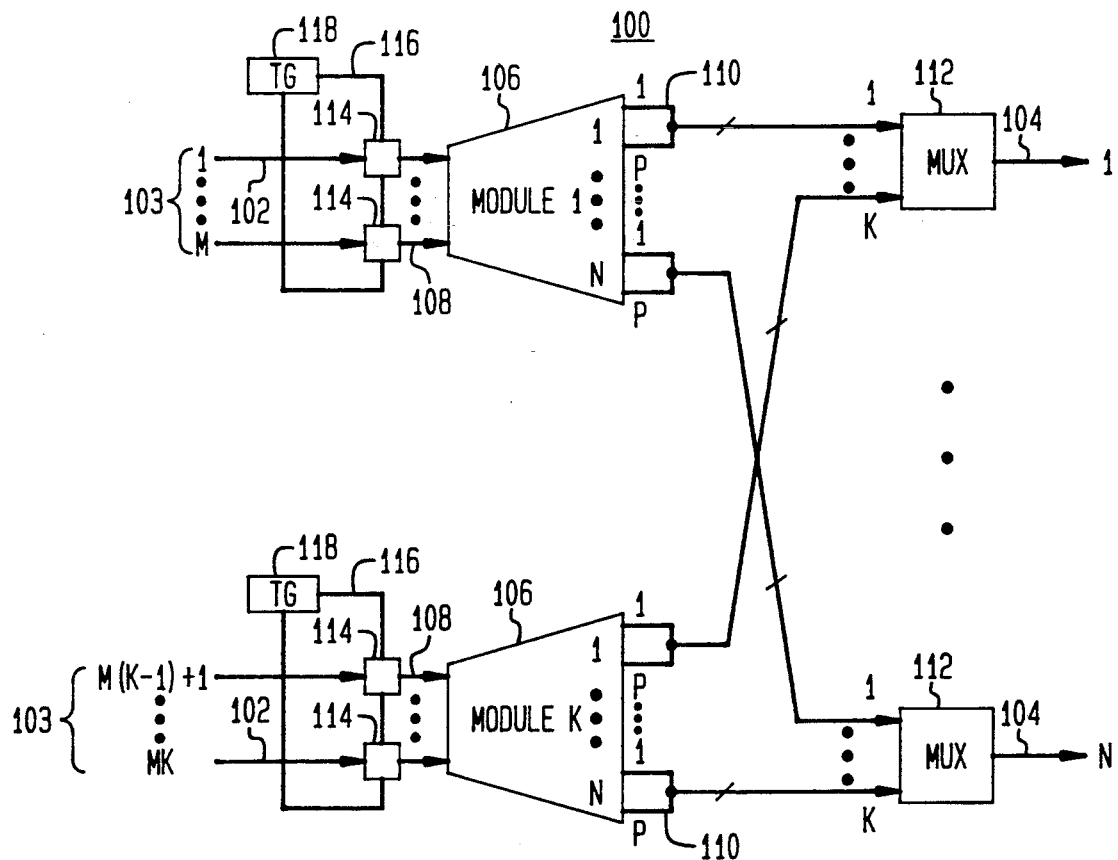
FIG. 6 is a table which summarizes the properties of the subnetworks comprising a switch module.
FIG. 7 schematically illustrates an alternative modular packet switch, in accordance with an alternative embodiment of the present invention.

FIG. 6 summarizes the properties of a switch module forming part of an N×N packet switch. In particular, the packet switch comprises K switch modules, with each module having M=N/K inputs and N outputs. As indicated above, such a switch module comprises a Batcher subnetwork, a set of binary tree subnetworks and a set of banyan subnetworks. FIG. 6 indicates the number of each type of network in the switch module, the dimensions of each network in the switch module, the number of stages of each network in the switch module, and the number of nodes of each network in the switch module.

In comparison to an N×N packet switch implemented using an N×N Batcher network and an N×N banyan network, the modular architecture cuts down the complexity of the Batcher network. However, the total number of nodes increases as K (i.e. the number of modules) increases. These extra nodes are not simply overhead. Instead, modularity improves both throughput and performance. This is because there are fewer input packets competing for outputs in each module.

There are two special cases worth mentioning. When K=1 (i.e. a situation where the switch comprises only one module), the switch architecture described above reduces to an ordinary Batcher-banyan switch. In addition, when K=N, the switch architecture reduces to the well-known knockout switch (see e.g., Y. S. Yeh et al "The Knockout Switch: A Simple Modular Architecture for High Performance Packet Switching", *IEEE Journal on Selected Areas in Communications*, Vol. SAC-5, No. 8, October 1987, pp. 1274–1283). In the knockout switch, each input is connected to every output by a broadcast bus. A bus interface at each output provides packet filters for allowing packets addressed to that output to pass and for blocking all others. If each module of the packet switch of the present switch has M=1 inputs, then the switch of the present invention is equivalent to a knockout switch.

As indicated above, it is a significant advantage of the switch architecture of the present invention, that the individual packet switch modules are synchronized independently. This can be understood more clearly by looking at the paths through the switch modules. In particular, each binary tree subnetwork 53 carries at most one packet during a time slot. Therefore synchronization is unnecessary for the binary tree networks. The multiplexers 44 (see FIG. 3 and 4), operating asynchronously, are able to collect packets coming from different banyan subnetworks 54 at different instants of time. Thus, each banyan subnetwork 54 can be synchronized independently without global synchronization. There are at most M packets to be synchronized over the logM(logM+1)/2 stages in each Batcher network and the logM stages of each banyan network. For the foregoing reasons, it is clear that only local clocks are needed and that no global synchronization of the switch modules is required in accordance with the present invention. This is an important advantage of the packet switch architecture of the present invention and enables the packet switch architecture of the present invention to be used to implement very large packet switches having on the order of N=10,000 inputs and outputs.

D. Contention Resolution and Extended Output Space

As indicated above, an inherent problem in the design of packet switches is output conflicts (i.e. external collisions) which occur when multiple packets simultaneously request the same output port. A procedure for arbitrating among input packets having the same destination is called a contention resolution algorithm. Three contention resolution algorithms developed in connection with conventional Batcher-banyan switches have been identified above. These are the Recirculation algorithm, the Three-Phase algorithm and the Ring Reservation algorithm. All three of these algorithms remain valid for the individual switch modules of the packet switch of the present invention.

In a packet switch, external collision probabilities can be significantly reduced by utilizing an output address extension technique (see e.g., Newman, P., A Fast Packet Switch for the Integrated Services Backbone Network, *IEEE Journal on Selected Areas in Communications*, Vol. 6, No. 9, December 1988, pp. 1468-1479; Wu, L. T., Arthurs, E., and Sincoskie, W. D., A Packet Network for BISDN Applications, *Proc. of 1988 Zurich Seminar on Digital Commun.*, Zurich, 1988, pp. 191-197.; Pattavina, A., Multichannel Bandwidth Allocation in a Broadband Packet Switch, *IEEE Journal on Selected Areas in Communications*, Vol. 6, No. 9, December 1988, pp. 1489-1499). In such a situation, the individual switch modules used to form an $N \times N$ packet switch are not $M \times N$ modules as described above but are instead $M \times NP$ modules. Such a module has only N distinct output addresses, but at each of the N addresses there are P outlets which allow up to P packets to be switched concurrently to the same one of the N output addresses. In this case, the expansion network used in the modules has $\log PN = \log P + \log N$ stages. Thus, $\log P + \log N$ address bits are required to perform the self-routing algorithm in the expansion network. Therefore, a $\log P = p$ bit group index is appended to the $\log N$-bit destination address contained in the packet headers. The group index enables a packet to be routed to a specific output in a group of outputs.

An algorithm which accomplishes both contention resolution and output address extension is described below in connection with FIG. 7. FIG. 7 illustrates a packet switch 100 which utilizes output address extension and a recirculation algorithm for contention resolution. The switch 100 of FIG. 7 has N inputs 102 and N outputs 104. The N inputs 102 are divided into K sets 103 of M inputs each. Thus the first set 103 of inputs 102 includes the inputs 1 ... M and the $K^{th}$ set 103 of inputs 102 includes the inputs $M(K-1)+1$ ... MK.

Each set of M inputs 102 is associated with a packet switch module 106. As indicated in FIG. 7, there are K switch modules 106. Illustratively, each module 106 comprises a Batcher network and an expansion network. Each module 106 has M inputs 108 which are associated with one of the K sets 103 of M inputs 102 described above. Each module 106 has NP outputs 110. More particularly, each module 106 has N distinct output addresses 1 ... N and P outputs 110 associated with each output address. The outputs 110 with the same address from each module 106 are multiplexed together by the multiplexers 112 and fed to the packet switch output 104 bearing that address.

An input port 114 is associated with each of the inputs 108 of the switch module 106. Illustratively, each input port 114 includes a queue (not shown) of packets waiting for service by that particular input. The input ports 114 associated with each switch module 106 are connected into a ring 116. Each ring 116 includes a token generator (TG) 118. The token generator 118 on each ring 116 issues a token at the beginning of each time slot. Each token is passed around the appropriate ring sequentially from input port to input port. The tokens are used by the input ports 114 to reserve outputs of the corresponding switch module 106 for the packets at the head of the associated queues.

The tokens are used in conjunction with a ring reservation algorithm which is executed at the input ports 114 to reserve outputs for particular packets. The Ring Reservation algorithm may be understood in conjunction with the flow chart of FIG. 8 which shows how this algorithm is executed at the input ports.

As shown in FIG. 8, a packet header 200 includes an n-bit destination address D. The destination address D indicates a group of P outputs. The packet header also includes a priority field S. A p-bit group index is determined by the ring reservation algorithm discussed below so that the packet is routed to a specific one of the outputs having the destination D. A token 202 also comprises two fields. A group index field $G_N ... G_1$ and a priority field T. As the token arrives at a particular input port, each subfield $G_j$ indicates the number of inputs which previously reserved the set of outputs j. The reservation cycle is divided into Q subcycles, where Q is the number of packet priority classes. During each reservation cycle a token will circulate around its ring from input port to input port Q times. During the $i^{th}$ subcycle, only packets in the $i^{th}$ priority class can make a reservation for an output.

Suppose the n-bit destination address in a packet header at a particular input port is $D = (d_n ... d_1)_2 = (h)_{10}$, wherein $d_n ... d_1$ is the binary representation of the n-bit destination address D and h is the decimal representation of the address D (box 204, FIG. 8). Suppose also that the subfield $G_h$ of the token may be represented as $G_h = g_{p+1} g_p ... g_1$ (box 204, FIG. 8). If the priority class S of the packet header is equal to the priority class T of the token, and, if the subfield $G_h = g_{p+1} g_p ... g_1$ is less than $P = 2^p$, indicating that there is unreserved output capacity at the output address $D = (h)_{10}$ (Box 206, FIG. 8), then the least significant p bits of $G_h$ are attached to the destination address $d_n ... d_1$ to form the routing address $d_1 ... d_n g_p ... g_1$ for this winning packet and the subfield $G_h$ in the token is incremented by 1 (Box 207, FIG. 8). The token is then passed to the next input (Box 208, FIG. 8).

On the other hand, if the priority class T of the token and the priority class S of the packet are not equal or if the subfield $G_h$ is equal to P (i.e. all P outputs for the output address $D = (h)_{10}$ have already been reserved) then the token is simply passed to the next input port (Box 208, FIG. 8). When such a failed reservation attempt takes place, the losing packet has to wait for the next reservation cycle, possibly with a higher priority class by modification of its priority field. When the token returns to its starting point after circulating around a ring in a particular reservation subcycle, the token generator will increase the priority field of the token by 1 to commence the next subcycle.

Illustratively, packets winning the contention resolution process which takes place during a particular time slot are transmitted through the switch module to the appropriate outputs during the next subsequent time slot.

The ring reservation algorithm described above in connection with FIG. 8 is particularly advantageous for use in with a modular switch architecture such as that shown in FIG. 8 because the ring reservation algorithm may be carried out independently for each switch module.

CONCLUSION

In short a modular architecture for a very large packet switch has been disclosed. In accordance with the present invention, switch modules, the building blocks of the packet switch, are themselves independently operated packet switches of relatively small size. Each module comprises a Batcher sorting subnetwork, a set of binary tree subnetworks, and a set of banyan subnetworks. Because each of the switch modules operates independently, operation and maintenance of the whole switch is significantly simplified. For building very large packet switches, it is a particular advantage of the inventive architecture that each of the switch modules can be synchronized independently.

Finally, the above-described embodiments of the invention are intended to be illustrative only. Numerous alternative embodiments may be devised by those skilled in the art without departing from the spirit and scope of the present invention as set forth in the following claims.

What is claimed is:

1. A packet switch comprising
   N inputs (N>1),
   N outputs,
   K (1<K<N) switch modules each of which has M=N/K inputs and at least N outputs and
   N means each for connecting corresponding outputs of said switch modules with one of said N outputs of said packet switch and for combining all packets from said corresponding outputs with one of said N outputs of said packet switch, where M, N, and K are integers.

2. A packet switch comprising
   N inputs,
   N outputs,
   K (1<K<N) switch modules each of which has M=N/K inputs and at least N outputs, and
   N multiplexers, each of said multiplexers multiplexing corresponding outputs of said switch modules and connecting said corresponding outputs with one of said N outputs of said packet switch, where M, N, and K are integers and wherein each of said modules comprises a sorting subnetwork and a routing network having more outputs than inputs.

3. The packet switch of claim 2 wherein said routing network is an expansion network comprising a set of binary tree subnetworks and a set of banyan subnetworks.

4. The packet switch of claim 3 wherein said sorting subnetwork is a Batcher subnetwork.

5. The packet switch of claim 4 wherein said Batcher subnetwork and said binary tree subnetworks are interconnected using a perfect shuffle interconnection pattern.

6. The packet switch of claim 2 wherein each of said switch modules includes N sets of P outputs (where P is an integer greater than 1) and wherein each of said multiplexers multiplexes corresponding sets of P outputs of said switch modules and connects said corresponding sets of P outputs with one of said N outputs of said packet switch.

7. A packet switch comprising
   N inputs,
   N outputs,
   K (1<K<N) switch modules each of which has M=N/K inputs and at least N outputs, and
   N multiplexers, each of said multiplexers multiplexing corresponding outputs of said switch modules and connecting said corresponding outputs with one of said N outputs of said packet switch, where M, N, and K are integers and wherein each of said switch modules is associated with a ring located at the inputs thereof for resolving conflicts among packets containing the same destination address.

8. The packet switch of claim 7 wherein each of said rings includes means for generating a token.

9. A packet switch comprising
   N inputs,
   N outputs,
   K (1<K<N) switch modules each of which has M=N/K inputs and at least N outputs, and
   N multiplexers, each of said multiplexers multiplexing corresponding outputs of said switch modules and connecting said corresponding outputs with one of said N outputs of said packet switch, where M, N, and K are integers and wherein each of said modules is synchronized independently.

10. A packet switch comprising
    N inputs,
    N outputs,
    K (1<K<N) switch modules each of which has M=N/K inputs and at least N outputs, and
    N multiplexers, each of said multiplexers multiplexing corresponding outputs of said switch modules and connecting said corresponding outputs with one of said N outputs of said packet switch, where M, N, and K are integers and wherein each of said multiplexers operates asynchronously.

11. A packet switch comprising
    a plurality of inputs,
    a plurality of outputs, and
    a plurality of independent switch modules arranged in parallel and each located between certain of said inputs and certain of said outputs, each of said switch modules comprising a sorting subnetwork and an expansion network including a set of binary tree subnetworks and a set of Banyan subnetworks.

12. The packet switch of claim 11 wherein said packet switch has N inputs, wherein said packet switch has N outputs, and wherein said packet switch includes K(1<K<N) modules each of which has M=N/K inputs and at least N outputs, where M, N, and K are integers.

13. The packet switch of claim 12 wherein each of said modules includes N sets of P outputs each, where P is an integer greater than one.

14. The packet switch of claim 11 wherein each of said module is synchronized independently.

15. The packet switch of claim 11 wherein each of said switch modules further includes means for resolving conflicts between packets having the same destination address.

16. The network of claim 11 wherein said packet switch further includes a plurality of multiplexers, each of said multiplexers multiplexing at least one banyan output from each of said modules and connecting the multiplexed banyan outputs with one of said plurality of outputs of said switch.

17. A packet switch comprising
    a plurality of outputs,
    a plurality of inputs for receiving packets to be routed by said switch to particular ones of said outputs, and
    a plurality of independently synchronized packet switch modules located between said inputs and said outputs, each of said modules requiring no global synchronization and each of said modules being able to provide a path from any of a subset of said inputs to any of said outputs, so that a packet to be routed between a particular input and a particular output is transmitted through only one module.

18. The packet switch of claim 17 wherein each of said modules comprises a sorting subnetwork, a set of binary tree subnetworks connected to said sorting networks and a set of banyan subnetwork connected to said binary tree subnetworks.

19. The packet switch of claim 17 wherein said packet switch further comprises a set of multiplexers, each of said multiplexers multiplexing at least one output from each of said module and connecting the multiplexed outputs with one of said outputs of said packet switch.

20. The packet switch of claim 17 wherein said packet switch has N inputs and N outputs, wherein said switch comprises $K(1<K<N)$ packet switch modules, and wherein each of said modules has $M=N/K$ inputs and at least N outputs, where N, M and K are integers.

21. The packet switch of claim 20 wherein each of said modules has N sets of P outputs each, where P is an integer greater than one.

22. The packet switch of claim 17 wherein each of said modules includes means for resolving conflicts between packets having the same destination.

23. A circuit for switching packets comprising a sorting network for sorting a set of input packets, a set of binary tree networks for receiving packets sorted by said sorting network, a set of banyan networks connected to said binary tree networks, and means for resolving conflicts between packets having the same destination address and said means comprises a ring including a token generator associated with said sorting network.

24. The circuit of claim 23 wherein said sorting network and said binary tree networks have a perfect shuffle interconnection pattern.

25. The circuit of claim 23 wherein said binary tree networks are stacked in a first direction and said banyan networks are stacked in a second direction orthogonal to said first direction.

* * * * *